United States Patent
Swaminathan et al.

(10) Patent No.: US 10,178,718 B2
(45) Date of Patent: Jan. 8, 2019

(54) SYSTEM AND METHOD FOR ACTIVE POWER FACTOR CORRECTION AND CURRENT REGULATION IN LED CIRCUIT

(71) Applicant: GLOBALFOUNDRIES INC., Grand Cayman (KY)

(72) Inventors: Rajesh Swaminathan, Bangalore (IN); Abhisek Khare, Bangalore (IN); Hrishikesh Bhagwat, Bangalore (IN); Sumon K Bose, Bangalore (IN); Krishnadas Bhagwat, Bangalore (IN); Somnath Samantha, Bangalore (IN); Ramesh G Karpur, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/531,458

(22) PCT Filed: Nov. 29, 2015

(86) PCT No.: PCT/IB2015/059190
§ 371 (c)(1),
(2) Date: May 29, 2017

(87) PCT Pub. No.: WO2016/084051
PCT Pub. Date: Jun. 2, 2016

(65) Prior Publication Data
US 2017/0273153 A1 Sep. 21, 2017

(30) Foreign Application Priority Data
Nov. 29, 2014 (IN) ............................. 5987/CHE/2014

(51) Int. Cl.
*G05F 1/00* (2006.01)
*H05B 41/16* (2006.01)
(Continued)

(52) U.S. Cl.
CPC ........... *H05B 33/0815* (2013.01); *G05F 1/70* (2013.01); *H05B 33/0845* (2013.01); *H05B 37/0272* (2013.01); *H05B 37/03* (2013.01)

(58) Field of Classification Search
CPC ............ H05B 33/0815; H05B 33/0845; H05B 37/0272; H05B 37/03
See application file for complete search history.

(56) References Cited

U.S. PATENT DOCUMENTS

5,949,229 A * 9/1999 Choi .................... H02M 1/4225
323/222
8,975,826 B1 * 3/2015 Stevens .............. H05B 33/0815
315/185 S
(Continued)

*Primary Examiner* — Dedei K Hammond
*Assistant Examiner* — Raymond R Chai
(74) *Attorney, Agent, or Firm* — Horizon IP Pte Ltd.

(57) ABSTRACT

The present invention discloses a system and method for active power factor correction and current regulation in led circuit. The system (100) used in the LED driver circuit performs active PFC and current regulation through the dynamic input current wave shaping by limiting peak currents. The dynamic wave 5 shaping scheme is realized through hardware and firmware and is used to strike an optimal balance between current accuracy, Power factor, THD and peak inductor currents. The system (100) is versatile enough to improve PF and current accuracy in LED circuits and indimmers circuits.

16 Claims, 5 Drawing Sheets

(51) Int. Cl.
*H05B 33/08* (2006.01)
*G05F 1/70* (2006.01)
*H05B 37/02* (2006.01)
*H05B 37/03* (2006.01)

(56) References Cited

U.S. PATENT DOCUMENTS

2011/0068713 A1\* 3/2011 Hoogzaad .......... H05B 33/0815
315/307
2011/0215736 A1\* 9/2011 Horbst ................ G05B 19/418
315/297
2013/0342122 A1\* 12/2013 Sawada ................ H03K 17/51
315/200 R \* cited by examiner

SYSTEM AND METHOD FOR ACTIVE POWER FACTOR CORRECTION AND CURRENT REGULATION IN LED CIRCUIT

TECHNICAL FIELD OF THE INVENTION

The present invention relates to a system and method to achieve optimal balance between current accuracy, inductor size, PF (Power Factor), THD (Total Harmonics Distortion) and peak inductor currents using the active PFC (Power Factor Correction) without the use of external components therein. More particularly, the present system achieves PFC through customized wave shaping profile by using the intelligent current control and peak current limit control.

BACKGROUND OF THE INVENTION

LEDs (Light Emitting Diode) are used in a variety of applications as indicator lamps and in different types of lighting environments, for example in aviation lighting, digital microscopes, automotive lighting, backlighting, advertising, general lighting, and traffic signals. The LEDs have significant advantages such as high efficiency, good directionality, color stability, high reliability, long life time, small size, and environmental safety. The LED systems having efficient power factor leads to various factors such as less thermal runaway issues, less chances of flicker and less fault scenarios. Power factor is defined as the ratio of real power to apparent power. Power factor correction (PFC) is the process of adjusting the characteristics of electric loads that create a power factor less than 1. Power factor correction is used to improve the stability and efficiency of the transmission network. The power factor correction inturn reduces the costs in the transmission networks by reducing the losses. A high power factor (i.e., close to unity, or "1") is generally desirable in a transmission system to reduce transmission losses and improve voltage regulation at the load.

Various types of conventional LED circuits that are used for active power factor correction are known in the prior art. The U.S. Pat. No. 7,952,293 B2describes the power factor correction and driver circuits. The claimed circuit defines about the power factor correction and driver circuits. Driver circuits configured for electrical loads such as series arrangements of light emitting diodes are also described. An exemplary embodiment of a driver circuit can implement a comparator and/or a voltage regulator to allow for improved output current uniformity for high-voltage applications and loads, such as series configurations of LEDs. Embodiment of PFC stages and driver stages can be combined for use as a power supply, and may be configured on a common circuit board. Power factor correction and driver circuits can be combined with one or more lighting elements as lighting.

The U.S. Pat. No. 7,295,452 B1 describes an active power factor correction circuit and control method thereof. The method comprises the following steps. Drive the power switch of the circuit so that the average inductor current waveform follows the rectified input voltage waveform. Suspend the operation of the power switch at a first moment in a first line cycle of the rectified input voltage and then resume the operation of the power switch at a second moment in a second line cycle of the rectified input voltage. The first moment is when the phase angle of the rectified input voltage exceeds a predetermined angle and the switching frequency of the power switch exceeds a predetermined frequency. The time span from the first moment to the end of the first line cycle is substantially as long as the time span from the beginning of the second line cycle to the second moment.

However, the claimed driver circuits and methods use analog and digital implementations. The analog implementations use external elements such as capacitors to estimate the average current and to achieve low loop band width for PFC. The driver circuit uses external components to detect accurate switching cycle by cycle power for open loop LED driver application. The digital implementations use expensive filter implementations and/or complicated high speed sampling schemes. These implementations does not provide enough flexibility to detect switching cycle by cycle power, loop band width adjustability, error detection etc.

Typically, the Switching Mode Power Supply (SMPS) does not receive continuous power from input supply, which leads to Low Power Factor (LPF) and THD. The passive PF scheme minimises the THD and improves the PF by drawing continues power from the input supply. However, the passive scheme leads to increased component count, cost, lower efficiency and board space requirements.

Typically, in convention PFC the wave shaping implies to higher currents at higher AC Supply and lower currents at lower supply, which leads in higher peak (inductor) currents and lower efficiency. The approach requires higher current rated inductors, which results in increased cost.

Hence, there is need for a system and method to achieve optimal balance between current accuracy, PF, THD and peak inductor currents using the active PFC without the use of external components therein. Further, the system achieves PFC through customized wave shaping profile by using the intelligent current control and peak current limit control, customizable through a firmware.

SUMMARY OF THE INVENTION

The present invention overcomes the drawbacks in the prior art and provides a system and method for active power factor correction and current regulation in led circuit. The system comprises of an input module, a computing module, a subtractor module, a gain module, an accumulator module, an analog to digital module, a multiplier module, a digital to analog module, a Pulse Width Modulation (PWM) module, the power and current estimator module and a firmware control module (micro controller). The input module allows the user(s) to enter the reference set point as per the requirement through a reference block. The computing module is configured to compute the average power/current from a supply line cycle to generate the average feedback signal using a filter average. The subtractor module is configured to receive the reference set point signal and the average feedback signal from the input module and computing module. The reference set point signal and average feedback signal is calculated by calculating the difference therein to produce an error signal using a subtractor. The gain module receives the difference error signal from the subtractor module and boost up the loop response and speed of correction in the error signal by adding the gain signal. The accumulator module is configured to accumulate the error signal from the gain module and determines the level of effective set point signal to ensure the average feedback signal equaling to the reference set point signal using an accumulator. In the preferred embodiment, the analog to digital module is configured to sense and convert the input line signal to the digital signal using an Analog to Digital Converter (ADC). The multiplier module is configured to multiply the output of the analog to digital module and the accumulator module using a multiplier. The multiplier module contains information of the input line signal and level of error signal. The digital to analog module receives and converts the digital signal from the multiplier module to the analog signal using a Digital to Analog Converter (DAC). The DAC establishes the set point to the inductor current level of the analog signal to perform active power factor correction and current regulation. Further, the system includes the control module which is configured to control the peak currents through inductor from input power supply using a switch. The controlled inductor peak currents are allowed to flow through a sense resistor to generate a voltage. The generated voltage is in form of saw tooth waveform. The saw tooth waveform determines the turn ON time and turns OFF time of the switch to achieve the active power factor correction and regulates the average LED current using the reference set point, wherein the average LED current tracks the reference set point in the LED circuit.

In a preferred embodiment of the invention, the system further comprises of a Pulse Width Modulation (PWM) module to turn ON the switch when the output of the DAC is larger than the voltage from the sense resistor using a PWM converter.

In a preferred embodiment of the invention, the system further comprises of a power and current estimator module configured to determine the cycle by cycle power/current based on various factors such as the DAC set point, turn ON time of the switch and switching period of the switch.

In a preferred embodiment of the invention, the system further comprises of a dim block, a thermal block and an input block. The dim block estimates the dimming duty cycle i.e. ON time and OFF time in the saw tooth waveform and in supply line frequency. The thermal block gives the thermal information of the outside electronic components such as LEDs and chips. The input block gives additional inputs such as error correction or any other desired information as per the applications in the LED circuits.

In a preferred embodiment of the invention, the system further detects and classifies the faults state when the average switching cycle by cycle power/current exceeds a specified tolerance band.

According to another embodiment of the invention, the system comprises of a firmware module which controls each block to generate the response for one or more events and transmit the response via the event based module to operate at-least one of the block selected from the list of the input module, the computing module, the subtractor module, the gain module, the accumulator module, the analog to digital module, the multiplier module, the digital to analog module and the control module for LED applications.

According to another embodiment of the invention, the invention provides method for active power factor correction and current regulation in led circuit. In most preferred embodiment, the method includes the step of entering the reference set point signal by the user(s) as per the requirement through a reference block. After entering the reference set point signal, the average power/current is computed from a supply line cycle to produce the average feedback signal. The difference between the reference set point signal and average feedback signal is calculated to produce an error signal using a subtractor. After calculating the error signal, the gain signal is added to the error signal to boost up the loop response and speed of correction in the error signal. The error signal accumulated and the level of effective set point signal is determined to ensure the average feedback signal equalling to the reference set point signal using an accumulator. In the preferred embodiment, the input line signal sensed and converted to the digital signal using an ADC. After obtaining the digital signal, the digital signal multiplied with the error signal using a multiplier. The multiplier module contains information of the input line signal and level of error signal. After multiplying, the digital signal is to the analog signal using a DAC. The reference set point to the peak inductor current level of the analog signal is established using the DAC. Finally, the current through inductor from input power supply is controlled using a switch. The controlled inductor current is allowed to flow through a sense resistor to generate a voltage. The generated voltage is in form of saw tooth waveform which will determine the turn ON time and turn OFF time of the switch to achieve the active power factor correction and regulates the average LED current using the reference set point, wherein the average LED current tracks the reference set point in the LED circuit.

In a preferred embodiment of the invention, the method further provides the switching operations for the saw tooth waveform to compute cycle by cycle power/current to activate the plurality of events such as triggering a bleeder circuitry in dimming applications using the firmware.

In a preferred embodiment of the invention, the method further realizes the desired low loop band width for controlling the average currents using the firmware.

The prior arts use the external components to determine the switching cycle by cycle power/current through peak sense voltage or current setting. The present invention accurately detects the switching cycle by cycle power/current through peak sense voltage or current setting without using the external components. The invented method uses the firmware to accurately realize the average currents from single to multiple supply cycles. The invented system provides post processing delay errors through a combination of hardware and firmware in LED driver applications.

The present invention provides a system and method which is simple, time saving, resource efficient, and cost effective. The invention may be used in variety of applications as indicator lamps and in different types of lighting environments which uses LED's.

It is to be understood that both the foregoing general description and the following details description are exemplary and explanatory and are intended to provide further explanation of the invention as claimed.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each embodiment is provided to explain the subject matter and not a limitation. These embodiments are described in sufficient detail to enable a person skilled in the art to practice the invention, and it is to be understood that other embodiments may be utilized and that logical, physical, and other changes may be made within the scope of the embodiments. The following detailed description is, therefore, not be taken as limiting the scope of the invention, but instead the invention is to be defined by the appended claims.

The present invention discloses a system and method for active power factor correction and current regulation in led circuit. The system used in the LED driver circuit performs active PFC through the dynamic input current wave shaping while limiting peak currents. The dynamic wave shaping scheme is realized through hardware and firmware and is used to strike an optimal balance between current accuracy, Power factor, THD and peak inductor currents. The system is versatile enough to improve PF and current accuracy in LED circuits and dimmers circuits.

Figure 1:
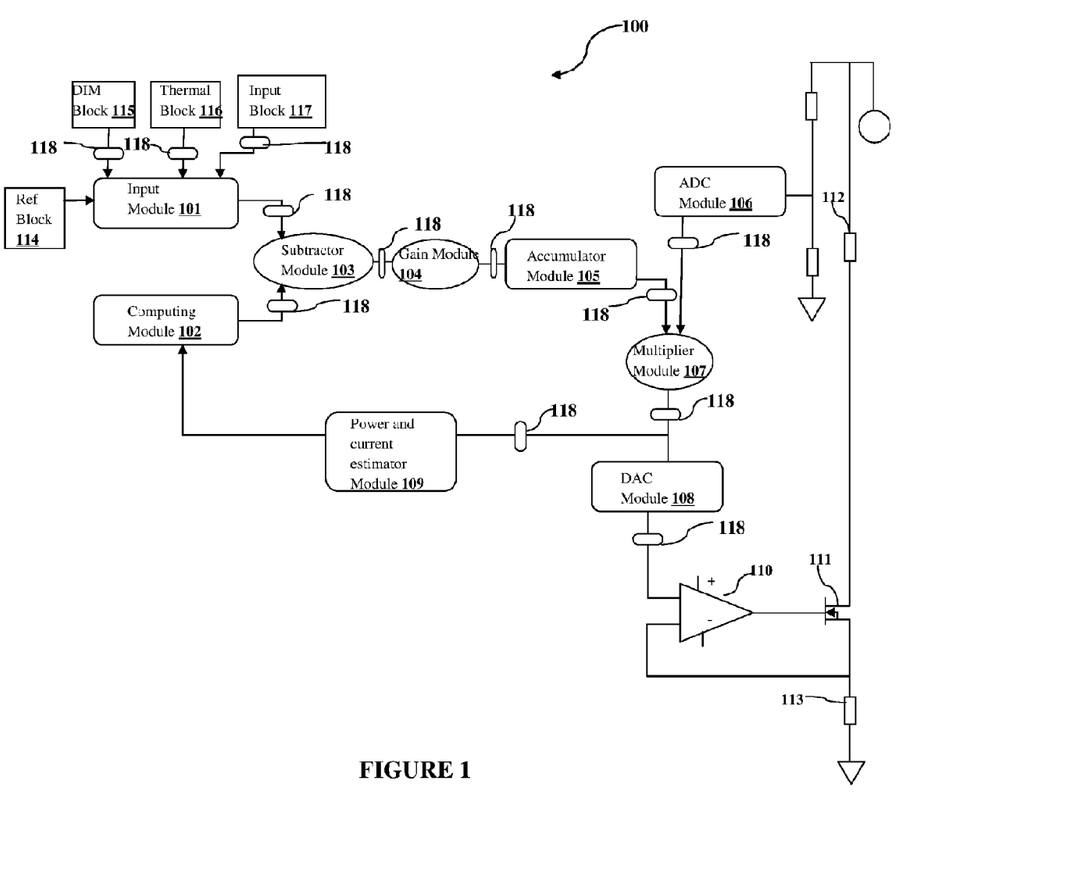
FIG. 1 illustrates a system for active power factor correction and current regulation in the led circuit, according to one embodiment of the invention.

FIG. 1 illustrates a system for active power factor correction and current regulation in led circuit, according to one embodiment of the invention. The system (100) comprises of an input module (101), a computing module (102), a subtractor module (103), a gain module (104), an accumulator module (105), an analog to digital module (106), a multiplier module (107), a digital to analog module (108), a Pulse Width Modulation (PWM) module (110), the power and current estimator module (109), a firmware module (118) and a control module. The input module (101) allows the user(s) to enter the reference set point as per the requirement through a reference block (114). The computing module (102) is configured to compute the average power or current from a supply line cycle to generate the average feedback signal using a filter average. The subtractor module (103) is configured to receive the reference set point signal and the average feedback signal from the input module (101) and computing module (102). The reference set point signal and average feedback signal is calculated by calculating the difference therein to produce an error signal using a subtractor. The gain module (104) receives the difference error signal from the subtractor module (103) and boost up the loop response and speed of correction in the error signal by adding the gain signal. The accumulator module (105) is configured to accumulate the error signal from the gain module and determines the level of effective reference set point signal to ensure the average feedback signal equaling to the reference set point signal using an accumulator.

In the preferred embodiment, the analog to digital converter module (106) is configured to sense and convert the input line signal to the digital signal using an Analog to Digital Converter (ADC). The multiplier module (107) is configured to multiply the output of the analog to digital module and the accumulator module using a multiplier. The multiplier module (107) contains information of the input line signal and level of error signal. The digital to analog module (108) receives and converts the digital signal from the multiplier module (107) to the analog signal using a Digital to Analog Converter (DAC). The DAC establishes the set point to the inductor current level of the analog signal to perform active power factor correction and regulates the average current. Further, the system (100) includes the control module which is configured to control the peak currents through inductor (112) from input power supply using a switch (111). The controlled inductor peak currents are allowed to flow through a sense resistor (113) to generate a voltage. The generated voltage is in form of saw tooth waveform. The saw tooth waveform determines the turn ON time and turns OFF time of the switch to achieve the active power factor correction and regulates the average LED current using the reference set point, wherein the average LED current tracks the reference set point in the LED circuit.

In the preferred embodiment, the firmware module (118) is configured to operate for each module. The firmware module (118) provides flexible operations for each module. The connection between each block in the system is done through the firmware module (118). The firmware module (118) provides wireless connection between each block in the system. The operation of each block remains same even though the position of each block is interchanged using the firmware module (118).

In the preferred embodiment, the Pulse Width Modulation (PWM) module (110) is configured to turn ON the switch when the output of the DAC is larger than the voltage from the sense resistor using a PWM converter. The system (100) further includes the power and current estimator module (109) which is configured to determine the cycle by cycle power or current based on various factors such as the DAC set point, turn ON time of the switch and switching period of the switch.

The system (100) further comprises of a dim block, a thermal block and an input block. The dim block (115), the thermal block (116) and the input block (117) updates and alerts the system (100) by inputting the various information. The dim block (115) estimates the dimming duty cycle i.e. ON time and OFF time in the saw tooth waveform and in the supply line frequency. The thermal block (116) gives the thermal information of the outside electronic components such as LEDs and chips. The input block (117) gives additional inputs to the system such as error correction or any other desired information as per the applications in the LED circuits.

In the preferred embodiment, the system (100) comprising a firmware module (118) which is configured to work for each block to generate the response for one or more events and transmit the response via the event based module to operate at-least one of the block selected from the list of the input module (101), the computing module (102), the subtractor module (103), the gain module (104), the accumulator module (105), the analog to digital module (106), the multiplier module (107), the digital to analog module (107) and the control module for LED applications.

In the preferred embodiment, the system (100) further calculates the error signal over a supply cycle and provides automatic averaging/filtering, wherein the calculated error signal produces wave shaping profile, wherein the wave shaping profile may be further customized through the firmware module (118).

Figure 2:
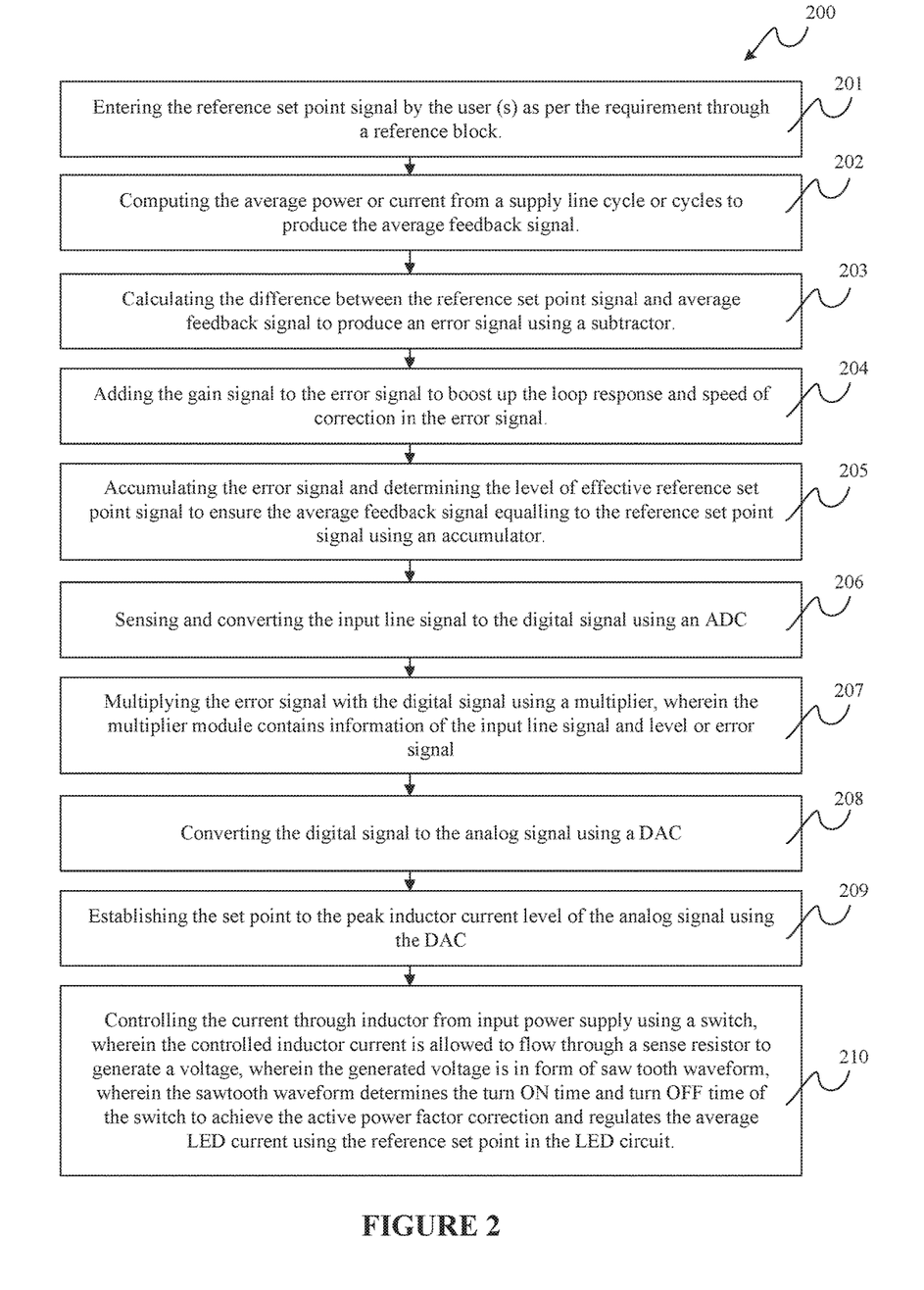
FIG. 2 illustrates the method flow involved in implementing the active power factor correction and current regulation in the led circuit, according to one embodiment of the invention.

FIG. 2 illustrates the method flow (200) involved in implementing the active power factor correction and current regulation in led circuit, according to one embodiment of the invention. At step (201), user(s) enters the reference set point signal in a reference block(s) as per the requirement. After entering the reference set point signal, at step (202), the average power or current from a supply line cycle or cycles is computed to produce the average feedback signal. At step (203), the difference is calculated between the reference set point signal and average feedback signal to produce an error signal. After calculating the error signal, at step (204), the gain signal is added to the error signal to boost up the loop response and speed of correction in the error signal. At step (205), the error signal is accumulated and the level of reference effective set point signal is determined to ensure that the average feedback signal equalling to the reference set point signal. At step (206), the input line signal is sensed and converted to the digital signal using an ADC. After converting the analog signal to digital signal, at step (207), the digital signal is multiplied the error signal using a multiplier. The multiplier module contains information of the input line signal and level of error signal. At step (208), the digital signal converted to the analog signal using a DAC. After receiving the analog signal, at step (209), the set point to the peak inductor current level of the analog signal is established using the DAC. Finally, at step (210), the current through inductor from input power supply is controlled using a switch. The controlled inductor current is allowed to flow through a sense resistor to generate a voltage. The generated voltage is in form of saw tooth waveform which will determine the turn ON time and turn OFF time of the switch to achieve the active power factor correction and and regulates the average LED current using the reference set point, wherein the average LED current tracks the reference set point in the LED circuit.

In the preferred embodiment, the method provides the switching operations for the saw tooth waveform to compute cycle by cycle power or current to activate the plurality of events such as triggering a bleeder circuitry in dimming applications using the firmware. Further, the method realizes the desired low loop band width for controlling the average LED currents using the firmware.

Figure 3:
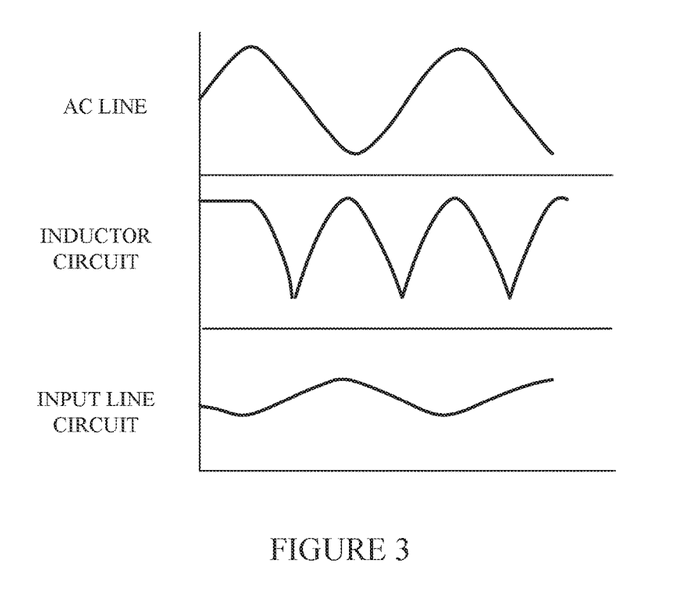
FIG. 3 shows the wave shaping profile for active power factor correction and current regulation in the led circuit, according to one embodiment of the invention.

FIG. 3 shows the wave shaping profile of active power factor correction and current regulation in the LED circuit, according to one embodiment of the invention. In the preferred embodiment, the top waveform indicates the Alternating Current (AC) line. The middle waveform indicates limited peak inductor current using DAC. The bottom waveform indicates the input line current.

Figure 4:
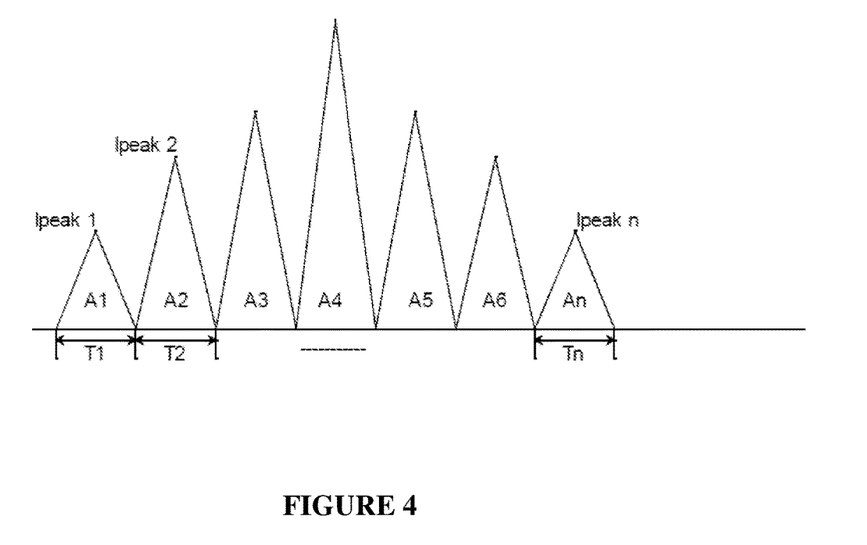
FIG. 4 shows the saw tooth wave of active power factor correction and current regulation in the led circuit, according to one embodiment of the invention.

FIG. 4 shows the saw tooth wave of active power factor correction and current regulation in the led circuit, according to one embodiment of the invention. In the preferred embodiment, the saw tooth waveform indicates the cycle by cycle current limit and regulation details. The saw tooth waveform is used to calculate the average LED current. The average LED current for each cycle is calculated using the below equation:

$$Average\ LED\ current = (A1+A2+A3+A4+\ldots+An)/(T1+T2+\ldots+Tn)$$

$$Ax = (Ipeakx)/2 = (Vrefx/2)$$

Figure 5:
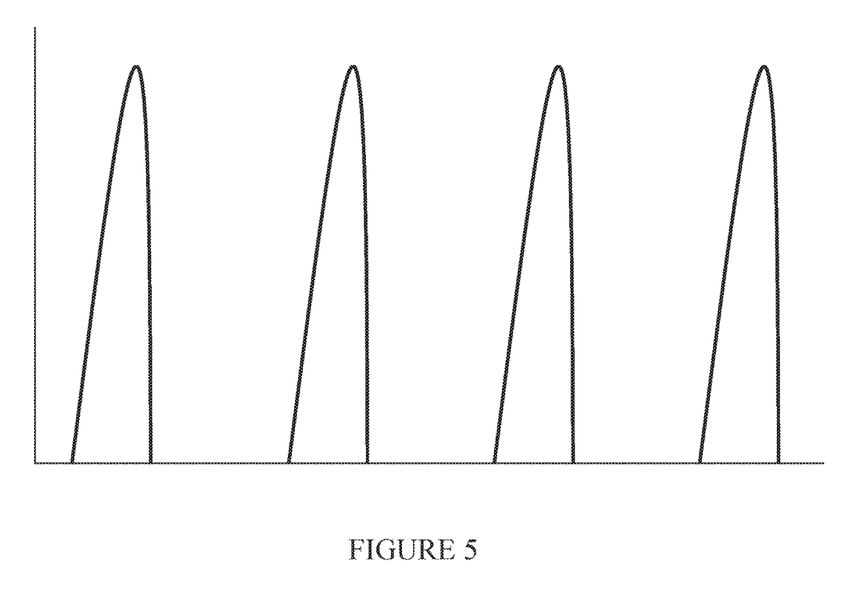
FIG. 5 shows the dimmer waveform shaping profile of the LED circuits, according to one embodiment of the invention.

FIG. 5 shows the dimmer waveform shaping profile of the LED circuits, according to one embodiment of the invention. In the preferred embodiment, the current may be modified by either directly reducing the direct current level to the LEDs or by reducing the average current through duty cycle modulation through the LED circuits.

The present invention discloses a system and method for active power factor correction and current regulation in led circuit. The system used in the LED driver circuit performs active PFC through the dynamic input current wave shaping while limiting peak currents. The dynamic wave shaping scheme is realized through hardware and firmware and is used to strike an optimal balance between current accuracy, Power factor, THD and peak inductor currents. The system is versatile enough to improve PF and current accuracy in LED circuits and dimmers circuits.

The prior arts use the external components to determine the switching cycle by cycle power/current through peak sense voltage or current setting. The present invention accurately detects the switching cycle by cycle power/current through peak sense voltage or current setting without using the external components. The invented method uses the firmware to accurately realize the average currents from single to multiple supply cycles. The invented system provides post processing delay errors through a combination of hardware and firmware in LED driver applications.

The present invention provides a system and method which is simple, time saving, resource efficient, and cost effective. The invention may be used in variety of applications as indicator lamps and in different types of lighting environments which uses LED's.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

We claim:

1. A system for active power factor correction and current regulation in an LED circuit, the system comprises:
   an input module configured to enable a user to enter a reference set point through a reference block;
   a computing module configured to compute an average power/current from a supply line cycle to generate an average feedback signal;
   a subtractor module configured to receive the reference set point and the average feedback signal from the input module and the computing module, wherein the substractor module generates an error signal based on a difference between the reference set point and the average feedback signal;
   a gain module configured to receive the error signal from the subtractor module and to boost up the error signal by adding a gain signal;
   an accumulator module configured to accumulate the error signal from the gain module, the accumulator module determines a level of effective set point to ensure the average feedback signal equalling to the reference set point;
   an analog to digital module configured to sense and convert an input line signal to an output digital signal using an Analog to Digital Converter (ADC);
   a multiplier module configured to multiple the output digital signal from the ADC;
   a digital to analog module configured to receive and convert the output digital signal to an output analog signal using a Digital to Analog Converter (DAC), wherein the DAC establishes a DAC established reference set point of the output analog signal to perform active power factor correction and to regulate an average current; and
   a control module comprising a switch and an inductor, wherein the switch is configured to control a peak current through the inductor, wherein the controlled peak current flows through a sense resistor to generate a voltage, wherein the generated voltage is in form of a sawtooth waveform, wherein the sawtooth waveform determines a turn ON time and a turn OFF time of the switch to achieve the active power factor correction, and the sawtooth waveform regulates an average LED current using the DAC established reference set point, wherein the average LED current tracks the DAC established reference set point in the LED circuit.

2. The system as claimed in claim 1, wherein the system further comprises a Pulse Width Modulation (PWM) module, wherein the PWM module turns ON the switch when the output analog signal of the DAC is larger than the generated voltage from the sense resistor.

3. The system as claimed in claim 1, wherein the system further comprises a power and current estimator module configured to determine a switching cycle by cycle power/current based on various factors such as the DAC established reference set point, the turn ON time of the switch and a switching period of the switch.

4. The system as claimed in claim 3, wherein the system further comprises a first firmware module, wherein the first firmware module detects and classifies a fault state when an average switching cycle by cycle power/current exceeds a specified tolerance band.

5. The system as claimed in claim 1, wherein the system further comprises a dim block, a thermal block and an input block, wherein the dim block estimates a dimming duty cycle i.e. an ON time and an OFF time in the sawtooth waveform and supply line frequency, wherein the thermal block gives a thermal information on a plurality of outside electronic components such as an LED and a chip, wherein the input block gives additional inputs such as an error correction in the LED circuit.

6. The system as claimed in claim 1, wherein the system further comprises a second firmware module, wherein the second firmware module provides an automatic averaging/filtering of the error signals over the supply line cycle, wherein the averaged/filtered error signal produces a customized wave shaping profile.

7. A system for active power factor correction and current regulation in an LED circuit, the system comprising:
an input module, a computing module, a subtractor module, a gain module, an accumulator module, an analog to digital module, a multiplier module, a digital to analog module and a control module for an LED application; and
wherein the control module includes a switch and an inductor, wherein the switch is configured to control a peak current through the inductor, wherein the controlled peak current flows through a sense resistor to generate a voltage, wherein the generated voltage is in form of a sawtooth waveform, wherein the sawtooth waveform determines a turn ON time and a turn OFF time of the switch to achieve the active power factor correction, and the sawtooth waveform regulates an average LED current using a DAC established reference set point, wherein the average LED current tracks the DAC established reference set point in the LED circuit.

8. The system as claimed in claim 7 wherein the analog to digital module is configured to sense and convert an input line signal to an output digital signal using an Analog to Digital Converter (ADC).

9. The system as claimed in claim 8 wherein the multiplier module multiplies the output digital signal, wherein the multiplier module contains information of the input line signal and a level of error signal.

10. The system as claimed in claim 9 wherein the digital to analog module receives and converts the output digital signal from the multiplier module to an output analog signal using a Digital to Analog Converter (DAC).

11. The system as claimed in claim 10 wherein the DAC established reference set point is established by the DAC of the digital to analog module.

12. The system as claimed in claim 11 wherein the average LED current tracks the DAC established reference set point in the LED circuit.

13. A method for active power factor correction and regulation of a current in an LED circuit, the method comprising:
entering a reference set point by a user through a reference block;
computing an average power/current from a supply line cycle to produce an average feedback signal;
calculating a difference between the reference set point and the average feedback signal to produce an error signal;
adding a gain signal to the error signal to boost up a loop response and a speed of correction in the error signal;
accumulating the error signal and determining a level of effective reference set point to ensure the average feedback signal equalling to the reference set point;
sensing and converting an input line signal to a digital signal using an Analog to Digital Converter (ADC);
multiplying the error signal with the digital signal;
converting the multiplied error signal with the digital signal to an analog signal using a Digital to Analog Converter (DAC);
establishing the reference set point to a peak inductor current level of the analog signal using the DAC; and
controlling the current through an inductor from an input power supply, wherein the controlled inductor current flows through a sense resistor to generate a voltage, wherein a wave shaping profile of the generated voltage determines a turn ON time and a turn OFF time of the switch to achieve the active power factor correction, and wherein the wave shaping profile of the generated voltage regulates an average LED current using the DAC established reference set point, wherein the average LED current tracks the DAC established reference set point in the LED circuit.

14. The method as claimed in claim 13, wherein the method further comprising switching a cycle by cycle power/current information of the sawtooth waveform to activate a plurality of events such as triggering a bleeder circuitry in dimming applications.

15. The method as claimed in claim 13, wherein the method further comprising realizing a desired low loop band width for controlling the average power/current.

16. The method as claimed in claim 13 wherein the wave shaping profile of the generated voltage is in form of a sawtooth waveform.

* * * * *